United States Patent
Matsumoto et al.

(10) Patent No.: US 6,966,601 B2
(45) Date of Patent: Nov. 22, 2005

(54) WEATHER STRIP FOR A VEHICLE DOOR

(75) Inventors: Atsushi Matsumoto, Aichi (JP); Katsuaki Nagai, Aichi (JP); Akihiro Tamaoki, Aichi (JP); Yuji Hisada, Aichi (JP)

(73) Assignee: Tokai Kogyo Co., Ltd., Obu (JP)

( * ) Notice: Subject to any disclaimer, the term of this patent is extended or adjusted under 35 U.S.C. 154(b) by 0 days.

(21) Appl. No.: 10/636,688

(22) Filed: Aug. 8, 2003

(65) Prior Publication Data

US 2004/0094989 A1     May 20, 2004

(30) Foreign Application Priority Data

Aug. 9, 2002   (JP) .............................. 2002-233958

(51) Int. Cl.[7] .............................................. E06B 7/16
(52) U.S. Cl. .............................. 296/146.2; 296/146.9; 49/484.1; 49/490.1; 49/502
(58) Field of Search .......................... 296/146.9, 146.2; 49/484.1, 502, 489.1, 490.1

(56) References Cited

U.S. PATENT DOCUMENTS

| | | | |
|---|---|---|---|
| 3,029,481 A | | 4/1962 | Henniges |
| 3,742,649 A | * | 7/1973 | Dochnahl .................... 49/441 |
| 3,763,596 A | | 10/1973 | Anderson |
| 5,561,003 A | * | 10/1996 | Nowosiadly |
| 5,740,640 A | * | 4/1998 | Yasuda |
| 6,299,235 B1 | * | 10/2001 | Davis et al. ........... 296/146.16 |

FOREIGN PATENT DOCUMENTS

| | | |
|---|---|---|
| DE | 36 15 078 | 11/1987 |
| EP | 0 586 073 | 3/1994 |
| EP | 0 854 062 | 7/1998 |
| WO | WO 01/34933 | 5/2001 |

* cited by examiner

*Primary Examiner*—Stephen Gordon
(74) *Attorney, Agent, or Firm*—Oblon, Spivak, McClelland, Maier & Neustadt, P.C.

(57) ABSTRACT

A weather strip for a vehicle door for being fitted to an upper edge flange of a door inner panel forming a window opening edge of the vehicle door having a lifting/lowering window pane. The weather strip includes: a main body portion having an insertion groove to be fitted to the upper edge flange; a seal lip portion projecting from the main body portion to be in resilient contact with the lifting/lowering window pane; and a resilient retainer to be resiliently engaged with a door trim. The main body portion includes a fixing portion to be engaged with the upper edge flange. The resilient retainer is projected outward from the main body portion in a substantially horizontal direction and perpendicular to an attaching portion provided at an upper portion of the door trim, when the insertion groove is fitted to the upper edge flange substantially.

11 Claims, 9 Drawing Sheets

WEATHER STRIP FOR A VEHICLE DOOR

BACKGROUND OF THE INVENTION

1. Field of the Invention

The present invention relates to a vehicle interior side weather strip (which is sometimes called an inner belt molding) which is installed along a lower end portion of a window opening portion of a vehicle door.

2. Background Art

Among vehicle doors (mainly side doors), one is known in which a lifting/lowering window pane (side door glass) disposed liftably in the door is disposed in such a manner as to be capable of being lifted or lowered along a lifting path the upper side of which is inclined toward the interior side more than the lower side thereof, i.e., which is inclined in such a manner as to be displaced toward the interior side as it is headed toward the upper side.

In addition, a vehicle interior side weather strip is installed by being fitted over the upper edge flange of a door inner panel, which forms a vehicle interior side window opening edge of the vehicle door.

Namely, the weather strip is generally comprised of an elongated main body portion having a substantially U-shaped cross section and forming an exterior side wall portion, a vehicle interior side wall portion, and an upper wall portion, which integrally connects these two side wall portions at a top, for forming an insertion groove for being fitted over the upper edge flange of the door inner panel; as well as an elongated seal lip projecting integrally from the exterior side wall portion of the main body portion toward a lifting/lowering window pane side.

In addition, among the weather strips, one is known which is so structured as to be provided with separately formed metal clips which engage with an attaching portion provided in such a manner as to project downward from a portion of the door trim close to an upper portion thereof.

In the vehicle door having the lifting/lowering window pane which is lifted or lowered with its upper side being inclined toward the interior side more than its lower side, as described above, if the upper edge flange of the door inner panel forming the interior side window opening edge projects in a substantially vertical state, the space (gap) between the upper edge flange and the lifting/lowering window pane becomes smaller toward the upper side of the upper edge flange.

For this reason, the operation of pushing in the door trim from a diagonally lower side or while rotating the door trim is required in both the case in which the weather strip is first attached to the door inner panel and the door trim is then fitted and the case in which the weather strip is first attached to the door trim and the weather strip is then attached to the door inner panel. However, there has been a drawback in that this operation is made difficult due to the narrow space.

In addition, since the structure is such that the metal clips are formed by leaf springs or the like separately from the weather strip, and the metal clips are disposed at predetermined positions on the weather strip, the fabrication of the metal clips and the number of assembling steps are required, pushing up the cost. In addition, since the number of component parts increases, variations occur in positioning during assembly, so that it is difficult to obtain accuracy.

SUMMARY OF THE INVENTION

In view of the above-described problems, an object of the invention is to provide a weather strip for a vehicle door which makes it possible to improve the assembling efficiency while reducing the production cost by forming the resilient retainers integrally with the main body portion of the weather strip.

To attain the object, the invention provides a weather strip for a vehicle door for being fitted to an upper edge flange of a door inner panel forming a window opening edge of an interior side of the vehicle door having a lifting/lowering window pane. The weather strip comprises: a main body portion extending longitudinally and having an insertion groove to be fitted to the upper edge flange from above, the insertion groove for allowing the upper edge flange to be inserted thereinto; a seal lip portion extending longitudinally along the main body portion and projecting integrally from the main body portion to be in resilient contact with the lifting/lowering window pane along the main body portion; and a resilient retainer to be resiliently engaged with a door trim, the resilient retainer formed integrally with the main body portion. The main body portion includes a fixing portion integrally formed therewith and configured to be engaged with the upper edge flange when the insertion groove is fitted to the upper edge flange so that the weather strip is fixed at a predetermined position on the upper edge flange. The resilient retainer is projected outward from the main body portion in a substantially horizontal direction when the insertion groove is fitted to the upper edge flange so that the resilient retainer is substantially perpendicular to an attaching portion provided at an upper portion of the door trim projecting substantially in vertical direction therefrom.

Accordingly, as the downwardly oriented attaching portion of the door trim is substantially horizontally moved and pushed onto the resilient retainer of the main body portion of the weather strip, the resilient retainer is resiliently engaged with the downwardly oriented attaching portion. The door trim is stably fixed by their engaging force, and the installing operation is facilitated.

In addition, in the case where the resilient retainer is formed separately from the main body portion, there are cases where the resilient retainer is fixed in an offset state with respect to the main body portion, or the resilient retainer becomes positionally offset unexpectedly after it is fixed. However, unlike that case, the resilient retainer is formed integrally with the main body portion, so that the drawback of the resilient retainer becoming positionally offset from the main body portion does not occur.

The weather strip may further comprises: a shielding lip extending longitudinally along the main body portion and projecting integrally from the main body portion substantially upward to cover an exterior side end portion of the upper portion of the door trim. The shielding lip is made of a material elastically deformable and softer than the main body portion. The material contains at least one of soft and flexible rubber and a synthetic resin material.

Accordingly, the elongated shielding lip is resiliently brought into pressure contact with the exterior side end portion of the upper portion of the door trim by the operation in which the downwardly oriented attaching portion of the door trim is substantially horizontally moved and pushed onto the resilient retainer of the main body portion of the weather strip. For this reason, it is possible to prevent a situation in which the shielding lip is unexpectedly caught between the door trim and the main body portion and is thereby deformed. Further, the exterior side end portion of the upper portion of the door trim can be satisfactorily covered by the shielding lip.

Preferably, the resilient retainer includes a plurality of resilient retainers. The plurality of resilient retainers are provided at predetermined intervals in a longitudinal direction of a vehicle interior sidewall of the main body portion in correspondence with a plurality of attaching holes provided in the attaching portion.

Accordingly, while the plurality of resilient retainers of the main body portion are being visually observed, their positions are confirmed, and the door trim is pressed in substantially horizontally. The resilient retainers are thereby inserted respectively into the plurality of attaching holes in the downwardly oriented attaching portion of the door trim, and are resiliently engaged therewith. Thus, the door trim can be installed by the engaging force of the resilient retainers and the attaching holes.

Preferably, the plurality of resilient retainers include a plurality of resilient retainer component parts formed separately from the main body portion. The plurality of resilient retainer are secured to the interior side wall at predetermined intervals in the longitudinal direction thereof.

Accordingly, it is unnecessary to form the main body portion and the resilient retainer component parts by respectively appropriately selecting from compatible materials, and the main body portion and the resilient retainer component parts can be formed by respectively using optimal materials. For example, the resilient retainer component parts can be formed of a polyoxymethylene (POM) or polyacetal resin material excelling in elasticity and sliding characteristics. Namely, since the polyoxymethylene (POM) resin material has a low viscosity when it is molten, it is difficult to form the resilient retainers integrally with the main body portion by co-extrusion in extrusion molding by using the POM resin material. However, as described above, after the resilient retainer component parts are formed separately from the main body portion, the resilient retainer component parts can be secured to the interior side wall portion of the main body portion by an adhesive agent, spin welding, ultrasonic welding, or the like. Hence, it is possible to easily construct the resilient retainers formed of the POM resin material.

Preferably, the plurality of resilient retainers are formed as remaining portions of a projecting portion for a resilient retainer, the projecting portion formed continuously along the longitudinal direction of the main body portion. The projecting portion for a resilient retainer is removed interruptedly in the longitudinal direction so that the remaining portions are remained.

Accordingly, as compared with a case in which a plurality of resilient retainers fabricated separately from the main body portion are secured by an adhesive agent, spin welding, ultrasonic welding, or the like, it is possible to reduce the number of components and the number of assembling steps. At the same time, it is possible to prevent the trouble that the resilient retainers are peeled and come off the main body portion.

Preferably, the resilient retainer extends longitudinally and continuously along the interior side wall such that the resilient retainer is engageable with one of a groove portion and a recessed portion provided in the attaching portion.

Accordingly, while the elongated resilient retainer is being visually observed, its position is confirmed, and the door trim is pressed in substantially horizontally. The resilient retainer is thereby engaged with a groove portion or a recessed portion in the downwardly oriented attaching portion of the door trim. Thus, the door trim can be installed by their engaging force.

In addition, as the elongated resilient retainer is integrally formed with the main body portion continuously, the trouble of the resilient retainer becoming peeled and coming off the main body portion does not occur.

Preferably, the resilient retainer has a low friction layer on at least a surface thereof to be in contact with the attaching portion.

Accordingly, the resilient retainer can be satisfactorily inserted into and engaged with the downwardly oriented attaching portion of the door trim. In addition, when there is a need to remove the door trim for the purpose of such as repair, the door trim can be easily pulled off and removed by pulling the door trim against the engaging force of the resilient retainer and the downwardly oriented attaching portion. For this reason, the removing operation of the door trim is also facilitated. Further, even in cases where the attachment and detachment of the door trim are repeated, the low friction layer makes it possible to alleviate the wear of the resilient retainer and the rattling and the like caused by the wear.

Preferably, the main body portion and the resilient retainer are made of a semi-hard or hard thermoplastic resin material exhibiting a durometer hardness HDA of 85 degrees or more in JIS K 7215. The seal lip portions is formed of a soft or semi-hard thermoplastic resin material which is compatible with said main body portion and exhibits a durometer hardness HDA of 60 to 80 degrees in JIS K 7215, the seal lip being integrally welded to the main body portion.

Accordingly, the main body portion, the resilient retainer, and the seal lip portion are welded to each other and are integrated.

Preferably, the main body portion, the resilient retainer, and the seal lip portion are formed of a thermoplastic resin material mainly based on an olefinic thermoplastic elastomer, and are integrally formed by extrusion molding based on co-extrusion.

Accordingly, the main body portion, the resilient retainer, and the seal lip portion can be formed integrally and easily by extrusion molding based on co-extrusion, and light weight can be attained by forming them by mainly using an olefinic thermoplastic elastomer material. Moreover, there is an advantage in that the olefinic thermoplastic elastomer materials are easily available.

Preferably, the resilient retainer has a pair of upper and lower retaining pieces each having a projecting portion for resiliently retaining the attaching portion of the door trim. The upper retaining piece has a projecting dimension greater than a projecting dimension of the lower retaining piece. Accordingly, when there is a need to effect intentional removal for the purpose of such as repair, the door trim can be easily removed from the pair of retaining pieces of the weather strip by first removing the projecting portion of the lower retaining piece and then removing the projecting portion of the upper retaining piece.

Meanwhile, with respect to unintentional removal (e.g., a tensile force acting on the upper side of the door trim from the outside), the door trim can be made difficult to remove.

Preferably, the upper and lower retaining pieces have tapered distal end portions respectively. The tapered distal end portions are opposed to each other in a mutually close or contacting state.

Accordingly, the operation of inserting the tapered distal end portions of the pair of retaining pieces into a hole or an opening portion of a groove formed in the attaching portion of the door trim is facilitated. Namely, if the tapered distal end portions of the pair of retaining pieces are in an open state, there are cases where a drawback occurs in that the insertion takes time since the tapered distal end portion of one of the retaining pieces hits against a peripheral portion of a hole or an opening portion of the groove formed in the attaching portion of the door trim. However, the above-described trouble can be alleviated as the tapered distal end portions of the pair of retaining pieces are opposed to each other in a mutually close or contacting state.

Preferably, the main body portion includes: a retaining recessed portion allowing a retaining pawl of the upper edge flange of the door panel to be inserted, a retaining projecting portion engageable with the retaining pawl, and an abutment portion to be abutted against the upper edge flange. The retaining pawl, the retaining projecting portion, and the abutment portion are respectively formed on a groove wall surface on a vehicle interior side wall of the insertion groove of the main body portion. The lip-shaped upper and lower pressing pieces both projecting toward the upper edge flange are integrally provided on a groove wall surface on an exterior sidewall portion side of the insertion groove.

Accordingly, the lip-shaped upper and lower pressing forces are projectingly provided on the groove wall surface of the insertion groove on the exterior side wall portion side of the main body portion, and the lip-shaped pressing pieces are not provided on the groove wall surface of the insertion groove on the interior side wall portion side of the main body portion. Therefore, the attachment of the door trim in a substantially horizontal state is not affected by the elastic deformation of the pressing pieces. Hence, there is a rigid feel, and the efficiency in the assembling operation is outstanding.

In addition, by virtue of the engagement between the retaining pawl of the upper edge flange of the door inner panel and the retaining projecting portion formed on the groove wall surface of the insertion groove on the interior side wall portion side of the main body portion, it is possible to obtain a clicking feel when the main body portion is fitted over the upper edge flange of the door inner panel. Hence, there are effects in the improvement of the efficiency in the assembling operation of the weather strip and in the prevention of the rattling of the main body portion during the lifting and lowering operation of the lifting/lowering window pane.

BRIEF DESCRIPTION OF THE DRAWINGS

The present invention may be more readily described with reference to the accompanying drawings, in which.

DETAILED DESCRIPTION OF THE PREFERRED EMBODIMENTS (First Embodiment)

Referring to FIGS. 1 to 6, a description will be given of a first embodiment of the invention.

Figure 1:
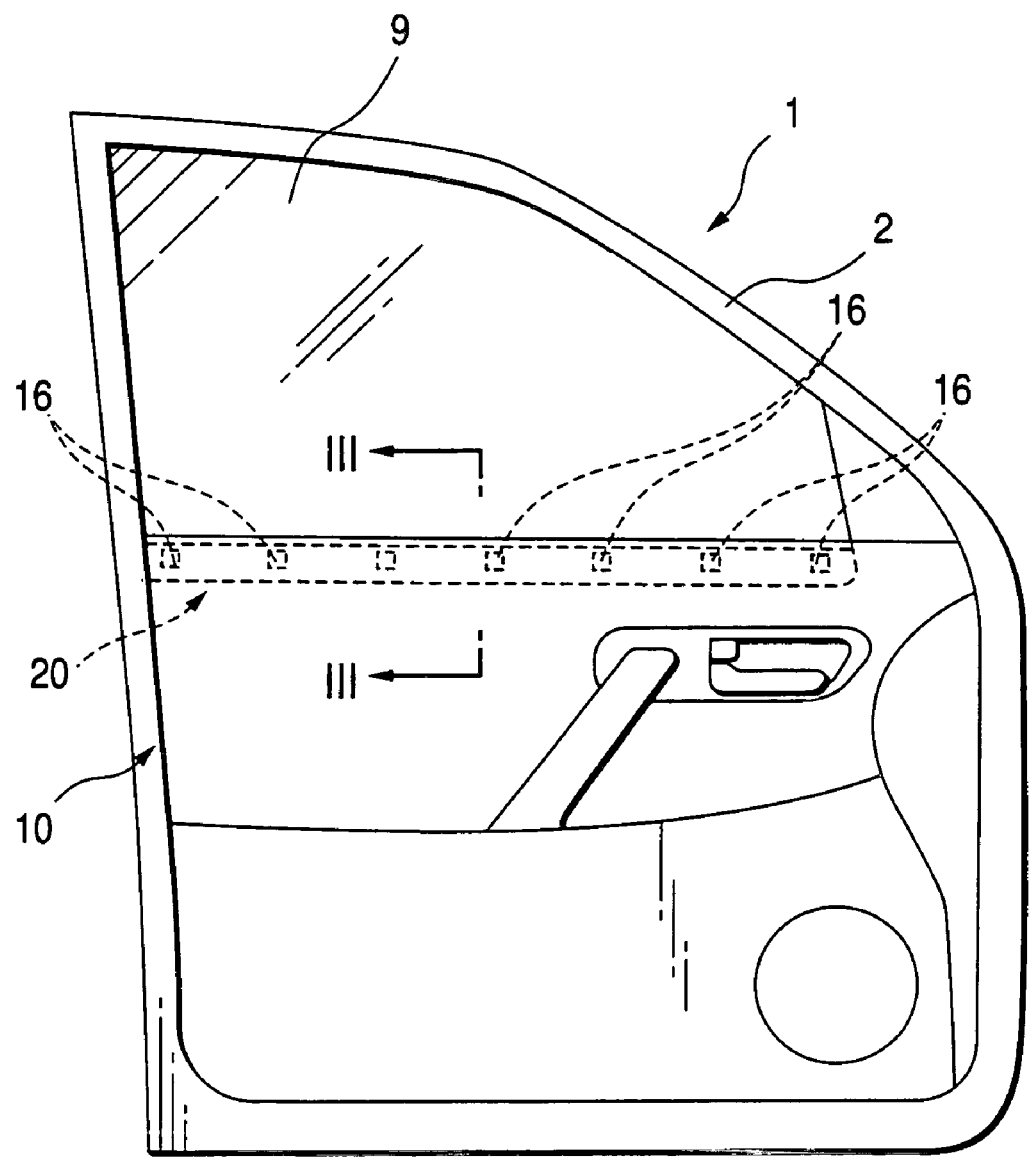
FIG. 1 is a front elevational view illustrating from the interior side a vehicle door fitted to a side portion of a vehicle in accordance with a first embodiment of the invention.
Figure 2:
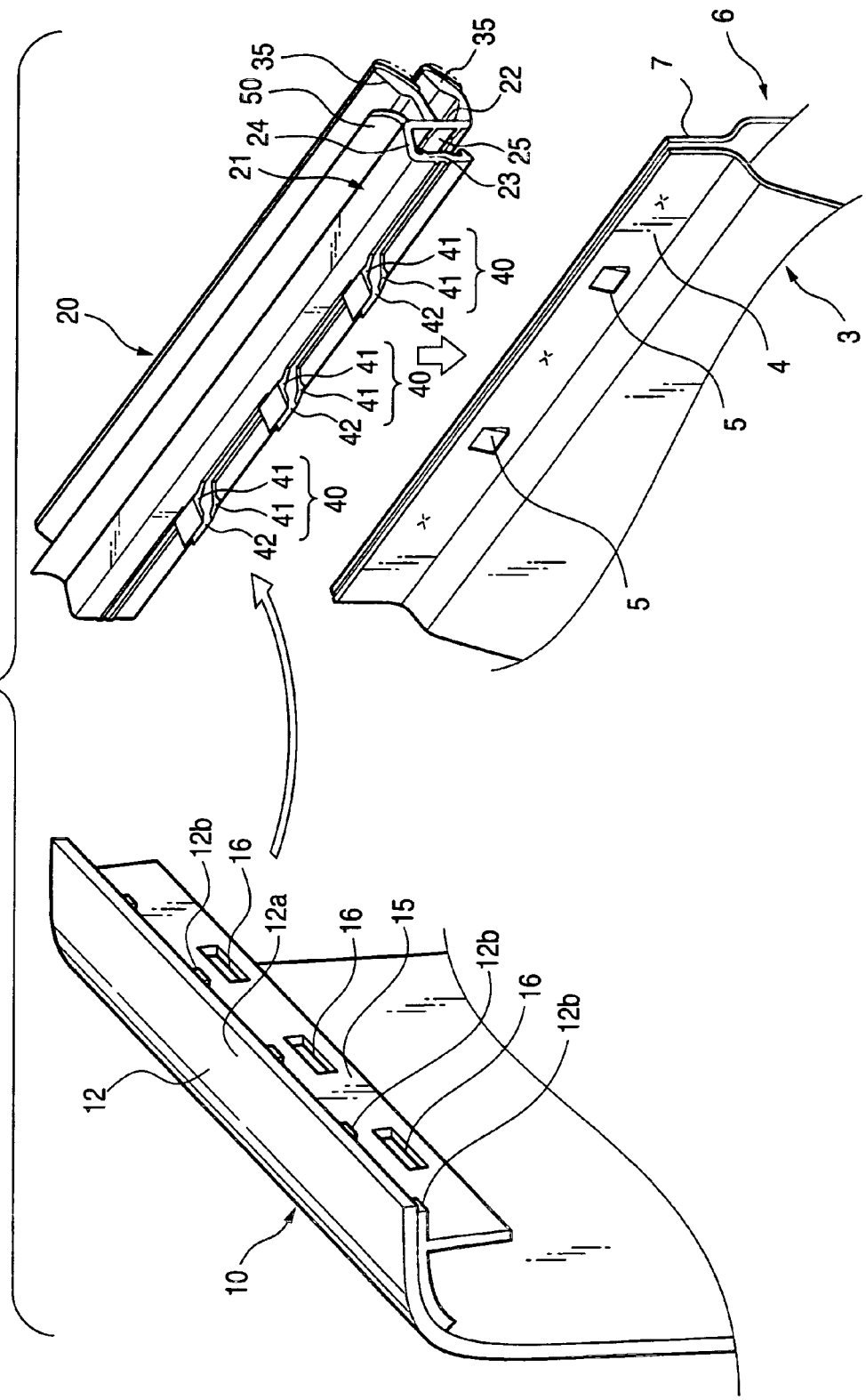
FIG. 2 is a perspective view illustrating a state before a door inner panel, a door trim, and a weather strip are assembled to each other in accordance with the first embodiment of the invention.
Figure 3:
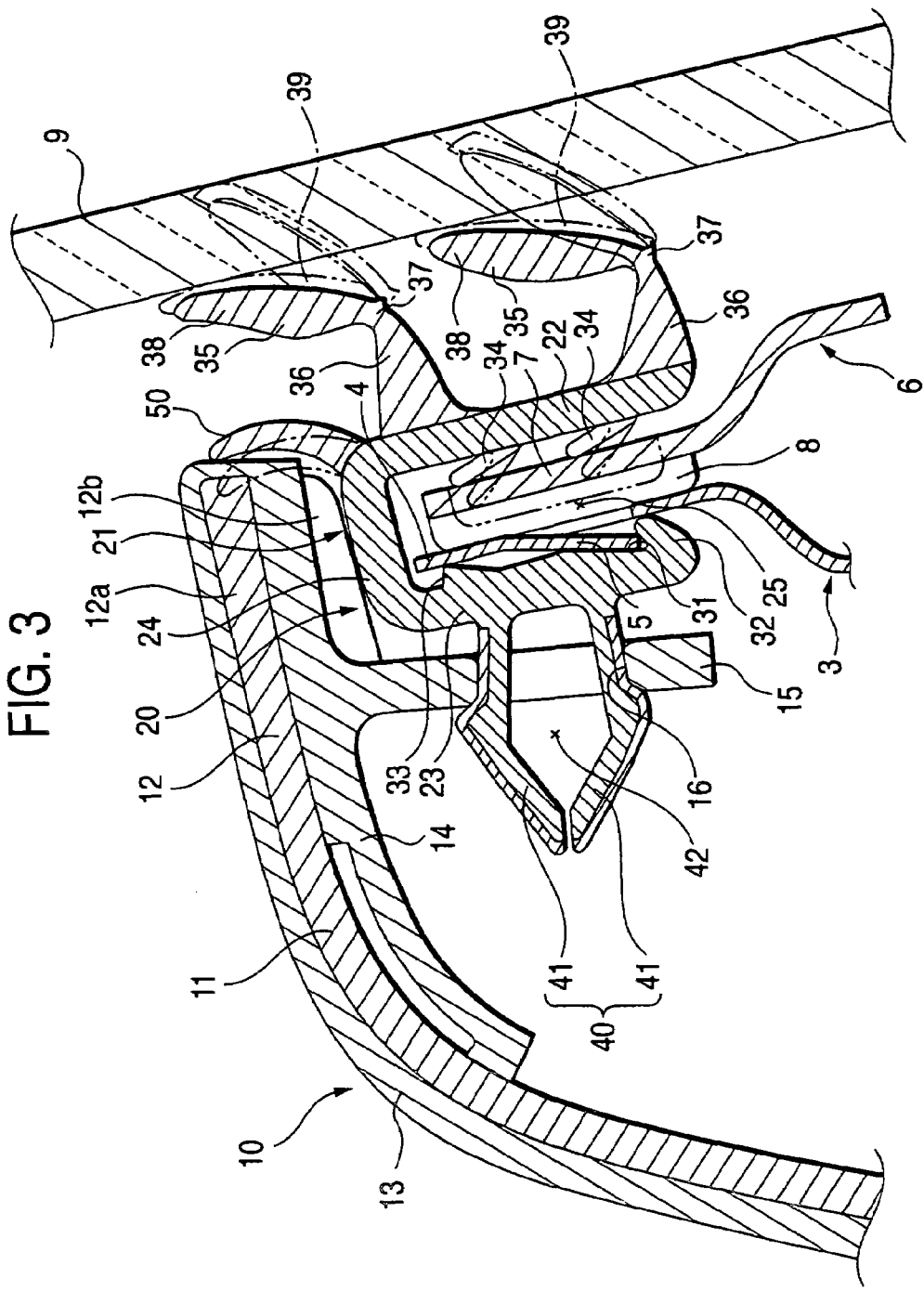
FIG. 3 is a sectional view taken along line III—III of FIG. 1 in accordance with the first:embodiment of the invention.
Figure 4:
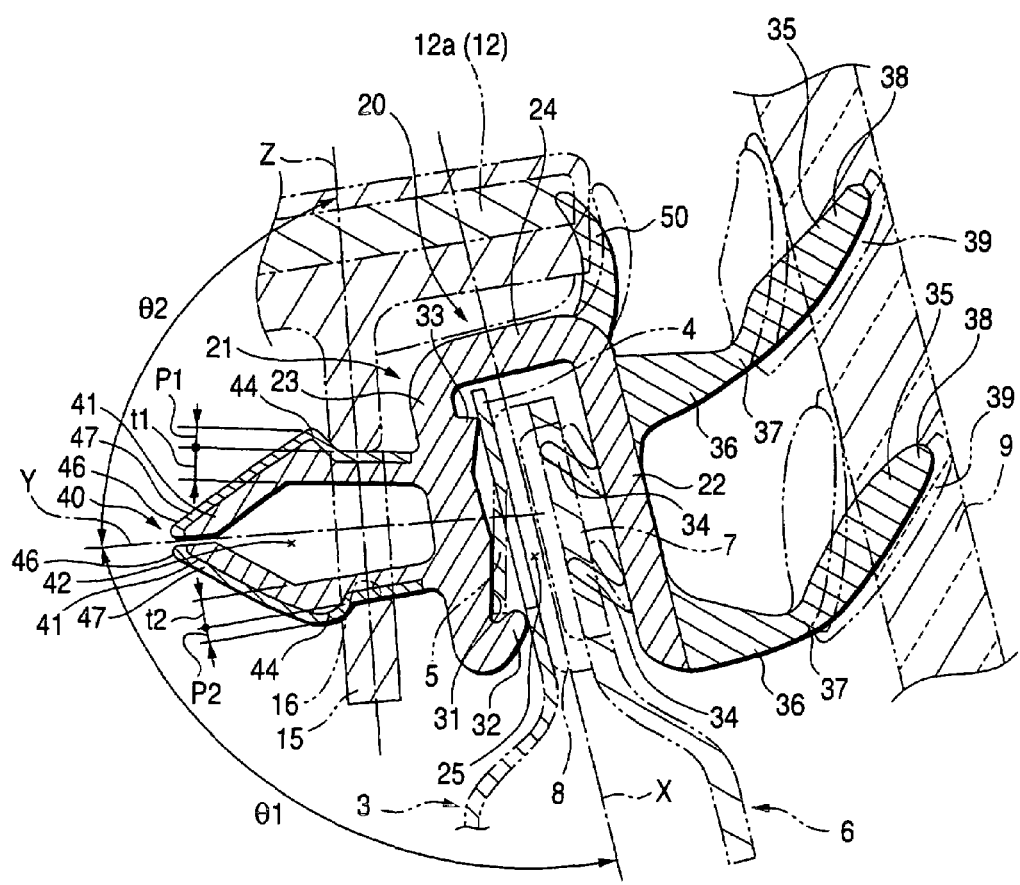
FIG. 4 is a cross-sectional view illustrating the weather strip which is in a free state before fitting in accordance with the first embodiment of the invention.
Figure 5:
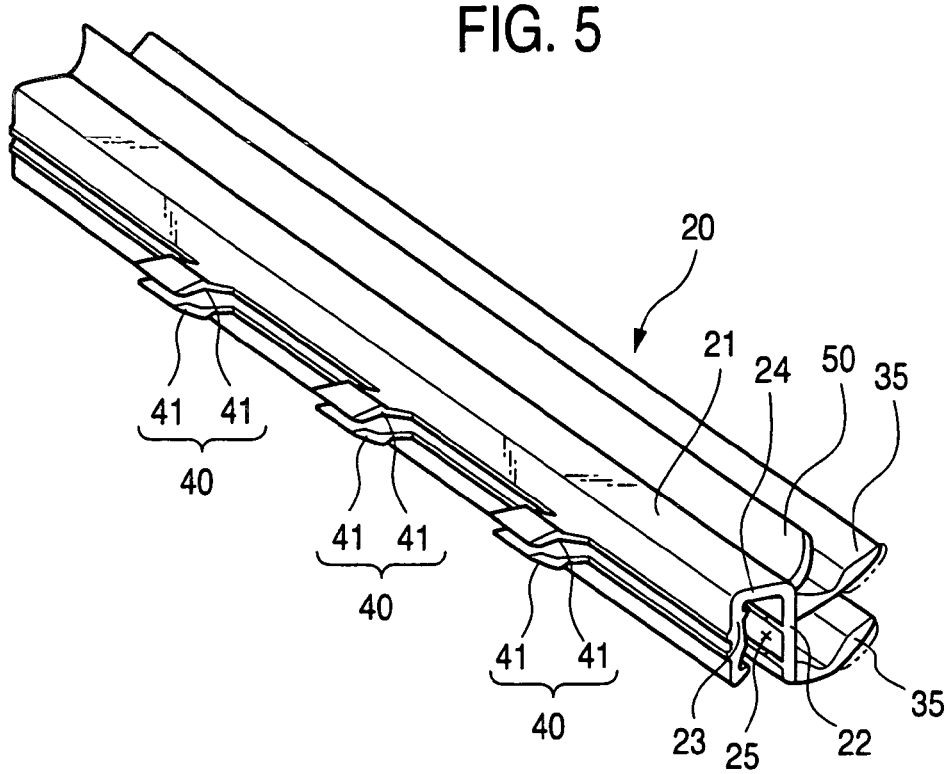
FIG. 5 is a perspective view illustrating the weather strip in accordance with the first embodiment of the invention.
Figure 6:
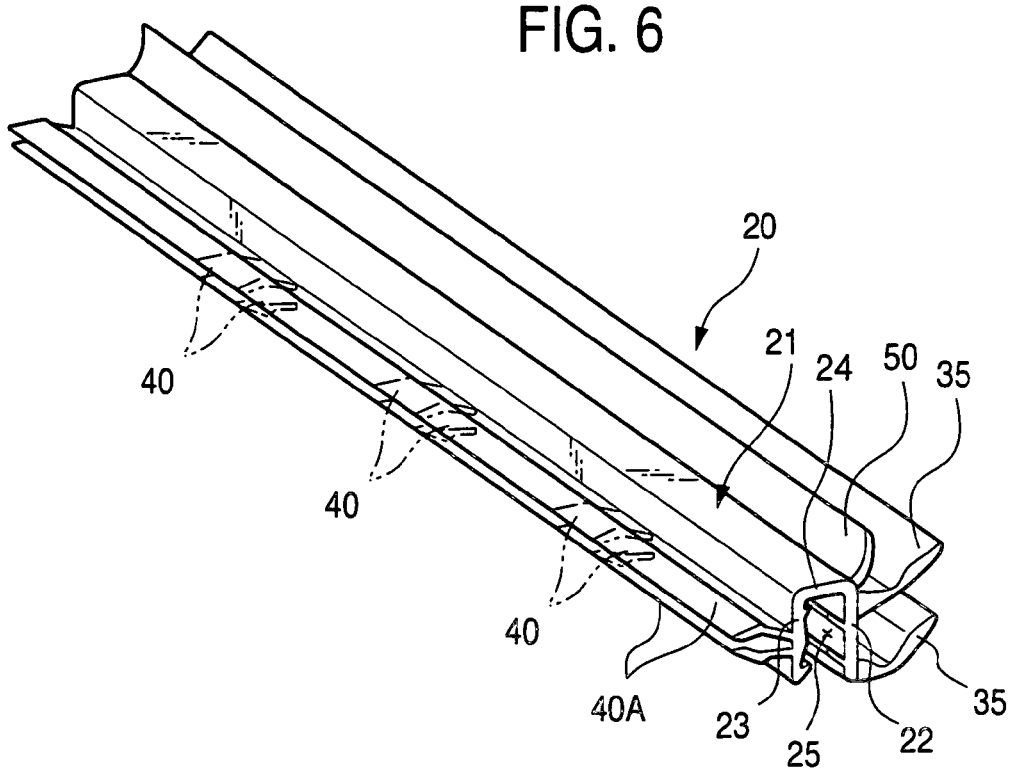
FIG. 6 is a perspective view illustrating an extrusion molding before forming the weather strip in accordance with the first embodiment of the invention.

FIG. 1 is a front elevational view illustrating from the interior side a vehicle door fitted to a side portion of a vehicle. FIG. 2 is a perspective view illustrating a state before a door inner panel, a door trim, and a weather strip are assembled to each other. FIG. 3 is a sectional view taken along line III—III of FIG. 1. FIG. 4 is a cross-sectional view illustrating the weather strip which is in a free state before fitting. FIG. 5 is a perspective view illustrating the weather strip. FIG. 6 is a perspective view illustrating an extrusion molding before forming the weather strip.

As shown in FIGS. 1 to 3, a window frame 2 for constituting a window opening portion is formed at upper portions of a door inner panel 3 and a door outer panel (not shown) of a vehicle door 1, which is fitted to a side portion of the vehicle.

In addition, a lifting/lowering window pane 9 for opening or closing the window opening portion is assembled in a space portion between the door inner panel 3 and the door outer panel in such a manner as to be capable of being lifted or lowered along a lifting path the upper side of which is inclined toward the interior side more than the lower side thereof, i.e., which is inclined in such a manner as to be displaced toward the interior side as it is headed toward the upper side.

As shown in FIGS. 2 and 3, an upper edge flange 4 of the door inner panel 3, which constitutes a window opening edge on the interior side, extends substantially in parallel to the inclination of the lifting/lowering window pane 9. On the lifting/lowering window pane 9 side of the upper edge flange 4, a reinforcing panel 6 is integrally secured to the lifting/lowering window pane 9 side of the upper edge flange 4 by spot welding at a projecting portion 8 formed at the upper edge flange 4.

In addition, a plurality of downwardly inclined retaining pawls 5 are formed on the upper edge flange 4 of the door inner panel 3 in such a manner as to be cut out toward the interior side at predetermined intervals in its longitudinal direction (in the forward and backward direction of the vehicle). Further, a weather strip 20 (which is also called a belt molding) is fitted to the upper edge flange 4 (including an upper edge flange 7 of the reinforcing panel 6) of the door inner panel 3 in such a manner as to cover the upper edge flanges 4 and 7.

As shown in FIGS. 2 and 3, a door trim 10 disposed on the interior side of the door inner panel 3 is formed into a predetermined shape by a board material such as a resin-based base material, a urethane-based base material, a wood-based base material, or a composite base material of these base materials. The door trim 10 is formed by using as its main body a trim body 11 whose upper portion 12 is curved toward the outer side of the vehicle. The interior side of the trim body 11 is covered with a surface layer 13. An attaching base portion 14, which integrally has a downwardly oriented attaching portion 15 made of a synthetic resin such as polypropylene and projecting from a lower surface thereof in a substantially suspended state, is secured to a lower surface of the upper portion 12 of the trim body 11 by means of an adhesive agent or the like. The door trim 10 is thereby formed. Further, a plurality of attaching holes 16 are formed in the downwardly oriented attaching portion 15 at predetermined intervals (e.g., pitches of 150 mm to 200 mm) in the longitudinal direction thereof.

The weather strip 20 is adapted to be stored on a reverse side of that portion 12a of the upper portion 12 of the door trim 10 (trim body 11) which juts out from the downwardly oriented attaching portion 15 toward the outer side of the vehicle. In addition, a positioning projecting edge 12b is formed at an vehicle exterior end of the jutting-out portion 12a of the upper portion 12 of the door trim 10.

As shown in FIGS. 2 to 4, the weather strip 20 has as its main components a main body portion 21, upper and lower seal lip portions 35, and resilient retainers 40, which are formed integrally.

The main body portion 21 and the resilient retainers 40 are both formed of materials such as thermoplastc synthetic resins (e.g., polypropylene (PP), polyethylene (PE), and acrylonitrile EPDM styrene (AES resin)), thermoplastic elastomers (e.g., olefinic thermoplastic elastomer (TPO)), and rubber which are compatible, elastically deformable, and rigid. The main body portion 21 and the resilient retainers 40 are elongated along the longitudinal direction of the upper edge flange 4 and are integrally formed.

In addition, as the main body portion 21 and the resilient retainers 40, it is preferable to use semi-hard or hard thermoplastic resin materials exhibiting, for example, a durometer hardness HDA of 85 degrees or more (85 to 95 degrees) in JIS K 7215 incorporated by reference. Further, it is more preferable to use materials which are mainly based on an olefinic thermoplastic elastomer (TPO) material. Specifically, "LEOSTOMER (tradename)" (95 degrees in HDA) made by RIKEN TECHNOS CORPORATION was used as the aforementioned TPO.

The upper and lower seal lip portions 35 are formed of such as a thermoplastic synthetic resin (e.g., PP, PE, or AES), a soft thermoplastic elastomer (e.g., TPO), or rubber which is softer than the main body portion 21, elastically deformable, and soft or semi-hard. The upper and lower seal lip portions 35 are formed in elongated shapes along the longitudinal direction of the main body portion 21.

In addition, as the upper and lower seal lip portions 35, it is preferable to use a soft or semi-hard thermoplastic resin material which is compatible with the main body portion 21 and exhibits, for example, a durometer hardness HDA of 60 to 80 degrees in JIS K 7215 incorporated by reference. Further, it is more preferable to use a material which is mainly based on an olefinic thermoplastic elastomer (TPO) material. Specifically, "MILASTOMER (tradename)" (70 degrees in HDA) made by Mitsui Chemicals, Inc. was used as the aforementioned TPO.

In particular, the main body portion 21, the resilient retainers 40, and the upper and lower seal lip portions 35 are preferably formed integrally by extrusion molding based on co-extrusion by mainly using an olefinic thermoplastic elastomer (TPO) material.

Namely, light weight can be attained by respectively forming the main body portion 21, the upper and lower seal lip portions 35, and the resilient retainers, 40 of the weather strip 20 by mainly using an olefinic thermoplastic elastomer (TPO) material. Moreover, there is an advantage in that the olefinic thermoplastic elastomer (TPO) materials are easily available.

As shown in FIGS. 3 and 4, the main body portion 21 integrally has an exterior side wall portion 22, a vehicle interior side wall portion 23, and an upper wall portion 24 which constitute an insertion groove 25 into which the upper edge flange 4 can be inserted from a diagonal direction in correspondence with the inclination of the upper edge flange 4.

In addition, a fixing means is integrally provided on the main body portion 21 to allow the weather strip 20 to be fixed at a predetermined position of the upper edge flange 4 by engaging with the upper edge flange 4 as the upper edge flange 4 of the door inner panel 3 is inserted into the main body portion 21 at its insertion groove 25.

In this first embodiment, as shown in FIG. 4, the fixing means is comprised of a retaining recessed portion 31, a retaining projecting portion 32, and an abutment portion 33 which are integrally formed on a groove wall surface on the interior side wall portion 23 side of the insertion groove 25 of the main body portion 21, as well as upper and lower pressing pieces 34 which are integrally formed on a groove wall surface on the exterior side wall portion 22 side of the insertion groove 25.

Namely, in the vicinity of a lower portion of the groove wall surface of the insertion groove 25 on the interior side wall portion 23 side of the main body portion 21, the retaining recessed portion 31, into which the retaining pawls 5 of the upper edge flange 4 of the door inner panel 3 can be inserted, as well as the retaining projection 32, which is capable of engaging with tips of the retaining pawls 5, are formed vertically continuously. Further, the abutment portion 33, which is capable of abutting against an upper portion of the upper edge flange 4 of the door inner panel 3, is projectingly provided integrally in the vicinity of an upper portion of the groove wall surface of the insertion groove 25 on the interior side wall portion 23 side of the main body portion 21. It should be noted that the retaining projecting portion 32 and the abutment portion 33 are integrally formed of the same material as that of the main body portion 21.

Meanwhile, at upper and lower portions of the groove wall surface of the insertion groove 25 on the exterior side wall portion 22 side of the main body portion 21, the upper and lower pressing pieces 34 are respectively projectingly provided in such a manner as to be upwardly inclined toward the upper edge flange 7 of the reinforcing panel 6. These pressing pieces 34 are respectively formed in lip form by a soft material such as rubber, a synthetic resin, or the like which is softer than the main body portion 21 and is elastically deformable (it is preferable to use the same material as that of the upper and lower seal lip portions 35).

Further, as shown in FIG. 3, when the insertion groove 25 of the main body portion 21 is fitted over the upper edge flange 4 of the door inner panel 3, the upper and lower pressing pieces 34 abut against the upper edge flange 7 of the reinforcing panel 6 and are elastically deformed by a predetermined amount. The arrangement provided is such that the interior side wall portion 23 of the main body portion 21 is drawn toward the upper edge flange 4 of the door inner panel 3 by the resiliency based on that elastic deformation.

As shown in FIGS. 3 and 4, the upper and lower seal lip portions 35 are integrally provided in such a manner as to project from upper and lower portions of one side surface (a side surface opposing the lifting/lowering window pane 9) of the exterior side wall portion 22 of the main body portion 21 toward the lifting/lowering window pane 9 side.

Each of these seal lip portions 35 has a thin-walled elastically deformable portion 37 at a substantially central portion in its projecting direction. The thickness of its root portion 36 is made large, and the thickness is made gradually small from that root portion 36 toward the thin-walled elastically deformation portion 37.

Further, an upwardly inclined seal portion 38 having an eyebrow-shaped cross section upwardly inclined is formed in such a manner as to extend from the thin-walled elastically deformable portion 37 to a distal end of each seal lip portion 35. Implanted bristles 39 which are brought into contact with the interior side surface of the lifting/lowering window pane 9 are provided, as required, on the lower surface of the seal portion 38. It should be noted that there are cases where a low friction layer is provided on the lower surface of the seal portion.

As shown in FIGS. 3 and 4, the resilient retainers 40 are provided in such a manner as to project substantially horizontally toward the interior side at vertically substantially central portions on the vehicle compartment surface side of the interior side wall portion 23 of the main body portion 21.

The resilient retainer 40 is for resiliently retaining and fixing the door trim 10, and is provided in a substantially horizontal direction substantially perpendicular to the downwardly oriented attaching portion 15 of the door trim 10.

In addition, the plurality of resilient retainers 40 are provided on the main body portion 21 at predetermined intervals (pitches of 150 mm to 200 mm corresponding to the pitches of arrangement of the attaching holes 16) in the longitudinal direction thereof in correspondence with the plurality of attaching holes 16 provided in the downwardly oriented attaching portion 15 of the door trim 10.

Each of these resilient retainers 40 is formed by a pair of retaining pieces 41 corresponding to upper and lower parts spaced apart with a slot 42 provided therebetween in such a manner as to be capable of being inserted in the attaching hole 16 by undergoing resiliently shrinking and expanding deformation.

As shown in FIG. 4, a projecting portion 44, which is capable of engaging with an edge of the attaching hole 16, is formed on each of the pair of retaining pieces 41 of each resilient retainer 40 and is located in the vicinity of its root portion. Further, a tapered distal end portion is formed whose thickness gradually decreases from that projecting portion 44 toward a distal end, and which forms a substantially acute-angled triangular shape in cross section. Further, on each of the surfaces away from the mutually opposing surfaces of the tapered distal end portions, an inclined guide surface 46 is formed for guiding the insertion of the pair of retaining pieces 41 along the attaching hole 16.

In addition, on at least the obverse surface of each of the pair of retaining pieces 41 coming into contact with the attaching hole 16, i.e., on a portion including the inclined guide surface 46 and extending to a portion of the projecting portion 44, a low friction layer 47 made of a low friction material whose coefficient of friction is small (e.g., a polyethylene resin of ultrahigh molecular weight) is integrally formed by co-extrusion at the time of the extrusion molding of the retaining pieces 41.

In this first embodiment, as shown in FIG. 4, the intersection angle $\theta 1$ between a parallel line X substantially parallel to the lifting/lowering window pane 9 and a line Y passing through the center portion of the resilient retainer 40 is set to be more than 90°. The intersection angle $\theta 2$ between the line Z passing through the center of the downwardly oriented attaching portion 15 of the door trim 10 attached to the weather strip 20 and the line Y passing through the center portion of the resilient retainer 40 is set to about 90°.

In addition, in this first embodiment, as shown in FIG. 4, a setting is provided such that if it is assumed that, of the pair of upper and lower retaining pieces 41 of the resilient retainer 40, the thickness of the upper retaining piece 41 is t1, the thickness of the lower retaining piece 41 is t2, the projecting dimension of the projecting portion 44 of the upper retaining piece 41 is P1, and the projecting dimension of the projecting portion 44 of the lower retaining piece 41 is P2, the following relationship preferably holds:

t1=t2, in which case P1>P2

In other words, the projecting dimension P1 of the projecting portion 44 of the upper retaining piece 41 is set to be greater than the projecting dimension P2 of the projecting portion 44 of the lower retaining piece 41.

Consequently, when there is a need to intentionally remove the weather strip 20 for the purpose of such as repair, the door trim 10 can be easily removed from the weather strip 20 by first removing the projecting portion 44 of the lower retaining piece 41 and then removing the projecting portion 44 of the upper retaining piece 41.

Meanwhile, with respect to unintentional removal (e.g., a tensile force acting on the upper side of the door trim 10 from the outside), the door trim 10 can be made difficult to remove by the engaging force of the projecting portion 44 of the upper retaining piece 41 and the attaching hole 16 of the downwardly oriented attaching portion 15 of the door trim 10.

In addition, in this first embodiment, as shown in FIG. 4, the tapered distal end portions of the pair of upper and lower retaining pieces 41 are opposed to each other in a mutually close or contacting state, e.g. with a slight interval of 1 mm or thereabouts. This facilitates the operation of inserting the tapered distal end portions of the pair of retaining pieces 41 into the attaching hole 16 in the downwardly oriented attaching portion 15 of the door trim 10. Namely, if the tapered distal end portions of the pair of retaining pieces 41 are in an open state, there are cases where a drawback occurs in that the insertion takes time since, of the pair of retaining pieces 41, the tapered distal end portion of one retaining piece 41 hits against a peripheral portion of the attaching hole 16 formed in the downwardly oriented attaching portion 15 of the door trim 10. However, the above-described trouble can be alleviated as the tapered distal end portions of the pair of retaining pieces 41 are opposed to each other in a mutually close or contacting state.

In addition, in this first embodiment, as shown in FIGS. 5 and 6, the plurality of resilient retainers 40 (pairs of retaining pieces 41) are formed such that a pair of protrusions 40A for resilient retainers, which correspond to their cross-sectional shapes and are formed continuously in elongated shapes along the longitudinal direction of the main body portion 21, are removed longitudinally interruptedly.

The plurality of resilient retainers 40 are respectively formed by their remaining portions (portions indicated by chain lines in FIG. 6).

Namely, as shown in FIG. 6, the protrusions 40A for resilient retainers are formed by extrusion molding in co-extrusion with the main body portion 21. As the protrusions 40A for resilient retainers are subsequently removed longitudinally interruptedly by cutting work by a press, the plurality of resilient retainers 40 (pairs of retaining pieces 41) are formed, as shown in FIG. 5.

In addition, in this first embodiment, as shown in FIGS. 3 and 4, an elongated shielding lip 50, which is oriented substantially upward and whose distal end portion is curved toward the interior side, is projectingly provided on the exterior side of the upper surface of the upper wall portion 24 of the main body portion 21. This sealing lip 50 is formed of a soft material such as rubber, a synthetic resin, or the like which is softer than the main body portion 21 and is elastically deformable (it is preferable to use the same material as that of the upper and lower seal lip portions 35). The sealing lip 50 is adapted to cover the exterior side end portion of the upper portion of the door trim 10 in a state in which it is elastically deformed by abutting against the exterior side end portion of the upper portion of the door trim 10.

The weather strip 20 in accordance with this first embodiment is constructed as described above. Accordingly, when the weather strip 20 and the door trim 10 are fitted to the upper edge flange 4 of the door inner panel 3 (including the upper edge flange 7 of the reinforcing panel 6), the main body portion 21 of the weather strip 20 at its insertion groove 25 is first fitted over the upper edge flange 4 from a diagonally upward direction of the inclination thereof. Then, the retaining pawls 5 of the upper edge flange 4 of the door inner panel 3 are inserted in the retaining recessed portion 31 on the interior side wall portion 23 side of the main body portion 21, and tips of the retaining pawls 5 are engaged with the retaining projecting portion 32.

Meanwhile, the upper and lower pressing pieces 34 of the exterior side wall portion 22 of the main body portion 21 are elastically deformed by a predetermined amount by coming into contact with the upper edge flange 4 of the reinforcing panel 6. The interior side wall portion 23 of the main body portion 21 is drawn toward the upper edge flange 4 of the door inner panel 3 by the resiliency based on the elastic deformation of these upper and lower pressing pieces 34. Consequently, the retaining projecting portion 32 of the interior side wall portion 23 and the retaining pawls 5 of the upper edge flange 4 are satisfactorily engaged and held. Thus, the weather strip 20 is stably fitted (fixed) by the engaging force of the retaining projecting portion 32 and the retaining pawls 5.

In other words, the lip-shaped upper and lower pressing pieces 34 are projectingly provided on the groove wall surface of the insertion groove 25 on the exterior side wall portion 22 side of the main body portion 21, and the lip-shaped pressing pieces are not provided on the groove wall surface of the insertion groove 25 on the interior side wall portion 23 side of the main body portion 21. Therefore, the attachment of the door trim 10 in a substantially horizontal state is not affected by the elastic deformation of the pressing pieces 34. Hence, there is a rigid feel, and the efficiency in the assembling operation is outstanding.

In addition, by virtue of the engagement between the retaining pawls 5 of the upper edge flange 4 of the door inner panel 3 and the retaining projecting portion 32 formed on the groove wall surface of the insertion groove 25 on the interior side wall portion 23 side of the main body portion 21, it is possible to obtain a clicking feel when the main body portion 21 is fitted over the upper edge flange 4 of the door inner panel 3. Hence, there are effects in the improvement of the efficiency in the assembling operation of the weather strip 20 and in the prevention of the rattling of the main body portion 21 during the lifting and lowering operation of the lifting/lowering window pane.

As described above, in the state in which the weather strip 20 is fitted to the upper edge flange 4 of the door inner panel 3, the plurality of resilient retainers 40 each having a pair of retaining pieces 41 respectively project substantially horizontally from the interior side wall portion 23 of the main body portion 21 toward the interior side, and are substantially perpendicular to the downwardly oriented attaching portion 15 of the door trim 10.

Thus, while the plurality of resilient retainers 40 of the main body portion 21 are being visually observed, their positions are confirmed, and the plurality of attaching holes 16 of the downwardly oriented attaching portion 15 of the door trim 10 are pressed in substantially horizontally. The resilient retainers 40 are thereby inserted into the respective attaching holes 16 and are resiliently engaged therewith. The door trim 10 is stably fitted (fixed) by the engaging force of the plurality of resilient retainers 40 and the attaching holes 16. Since the door trim 10 can be engaged by merely pressing it horizontally toward the outer side of the vehicle in this manner, the troublesome operation of pressing in the door trim 10 from diagonally below or while being rotated is not necessary, and the door trim 10 can be attached simply.

Namely, when the pairs of retaining pieces 41 of the plurality of resilient retainers 40 are respectively inserted into the attaching holes 16, the pairs of retaining pieces 41 are elastically shrunk and deformed as their guide surfaces 46 are brought into contact with the edges of the attaching holes 16. When the projecting portions 44 of the pairs of retaining pieces 41 are passed through the attaching holes 16 and are inserted by predetermined amounts, the pairs of retaining pieces 41 are resiliently engaged with the attaching holes 16 by the resiliency with which they try to resiliently restore themselves to their original states. The door trim 10 is stably fitted (fixed) by their engaging force.

In addition, as described above, when the attaching holes 16 of the downwardly oriented attaching portion 15 of the door trim 10 are pressed substantially horizontally to receive the plurality of resilient retainers 40 of the main body portion 21, the positioning projecting edge 12b at the longitudinal end of the jutting-out portion 12a of the upper portion 12 of the door trim 10 can be positioned by being made to abut against the longitudinal end of the weather strip 20. For this reason, the plurality of attaching holes 16 and the plurality of resilient retainers 40 can be positioned easily and accurately, thereby making it possible to improve the efficiency in the fitting operation of the door trim 10.

In particular, the resilient retainers 40 are formed of a material such as a thermoplastc synthetic resin (e.g., PP, PE, or AES), a thermoplastic elastomer (e.g., TPO), or rubber which is elastically deformable and rigid, and the resilient retainers 40 are formed integrally with the main body portion 21.

For this reason, as compared with a case in which the resilient retainers are formed by leaf springs or the like separately from the main body portion 21, it is possible to reduce the number of components and the number of assembling steps, thereby making it possible to reduce the cost.

Moreover, since the resilient retainers 40 are formed of a material such as a resin or rubber, even in cases where the attachment and detachment of the door trim 10 are repeated, it is possible to alleviate the trouble that the attaching holes 16 of the downwardly oriented attaching portion 15 of the door trim 10 are worn by the resilient retainers 40.

In addition, in this first embodiment, of each of the pairs of retaining pieces 41 making up the plurality of resilient retainers 40, on at least the obverse surface side which comes into contact with the attaching hole 16, i.e., on a portion including the inclined guide surface 46 and extending to a portion of the projecting portion 44, the low friction layer 47 having a small coefficient of friction is formed. For this reason, the pairs of retaining pieces 41 of the plurality of resilient retainers 40 are respectively inserted satisfactorily into and reliably engaged with the attaching holes 16.

In addition, at the time of removal of the door trim 10, as the pairs of retaining pieces 41 are pulled out against the engaging force of the pairs of retaining pieces 41 and the attaching holes 16, the low friction layers 47 of the pairs of retaining pieces 41 slide along the edges of the attaching holes 16. The pairs of retaining pieces 41 are thereby pulled out while undergoing resilient shrinkage and deformation. For this reason, the removal of the door trim 10 is also facilitated.

Furthermore, even in cases where the attachment and detachment of the door trim 10 are repeated, the low friction layers 47 make it possible to alleviate the wear of the pairs of retaining pieces 41 or edges of the attaching holes 16, as well as the rattling and the like caused by the wear, with the result that durability excels.

In addition, in this first embodiment, the elongated shielding lip 50, which is curved in such a manner as to be oriented substantially upward toward the exterior side end portion of the upper portion of the door trim 10, is integrally formed on the upper surface of the upper wall portion 24 of the main body portion 21.

For this reason, the shielding lip 50 is resiliently brought into pressure contact with the exterior side end portion of the upper portion of the door trim 10 by the operation of substantially horizontally moving and pushing the attaching holes 16 of the downwardly oriented attaching portion 15 of the door trim 10 so as to be fitted over the resilient retainers 40 of the main body portion 21. This makes it possible to prevent a situation in which the shielding lip 50 is unexpectedly caught between the door trim 10 and the main body portion 21 and is thereby deformed. Further, the exterior side end portion of the upper portion of the door trim 10 can be covered by the shielding lip 50, so that it is possible to prevent the drawback that a gap is produced between the door trim 10 and the weather strip 20, thereby aggravating the appearance.

In addition, in this first embodiment, the weather strip 20 can be accommodated at a position which is normally not viewed from the interior side, i.e., on the reverse side of the portion 12a jutting out from the downwardly oriented attaching portion 15 toward the outer side of the vehicle. Hence, improvement of the appearance can be attained (see FIG. 3).

In addition, in this first embodiment, the plurality of resilient retainers 40 (pairs of retaining pieces 41) are formed such that the pair of protrusions 40A for resilient retainers, which correspond to their cross-sectional shapes and are formed continuously in elongated shapes along the longitudinal direction of the main body portion 21, are removed longitudinally interruptedly. The plurality of resilient retainers 40 are respectively formed by their remaining portions (portions indicated by chain lines in FIG. 6).

Accordingly, as compared with a case in which a plurality of resilient retainers fabricated separately from the main body portion 21 are secured by an adhesive agent, it is possible to reduce the number of components and the number of assembling steps. At the same time, it is possible to prevent the trouble that the resilient retainers 40 are peeled and come off the main body portion 21. Furthermore, it is possible to prevent the drawback that variations can otherwise occur in positioning during assembly owing to an increase in the number of components, making it difficult to obtain accuracy.

(Second Embodiment)

Next, a description will be given of a second embodiment of the invention with reference to FIGS. 7 and 8.

Figure 7:
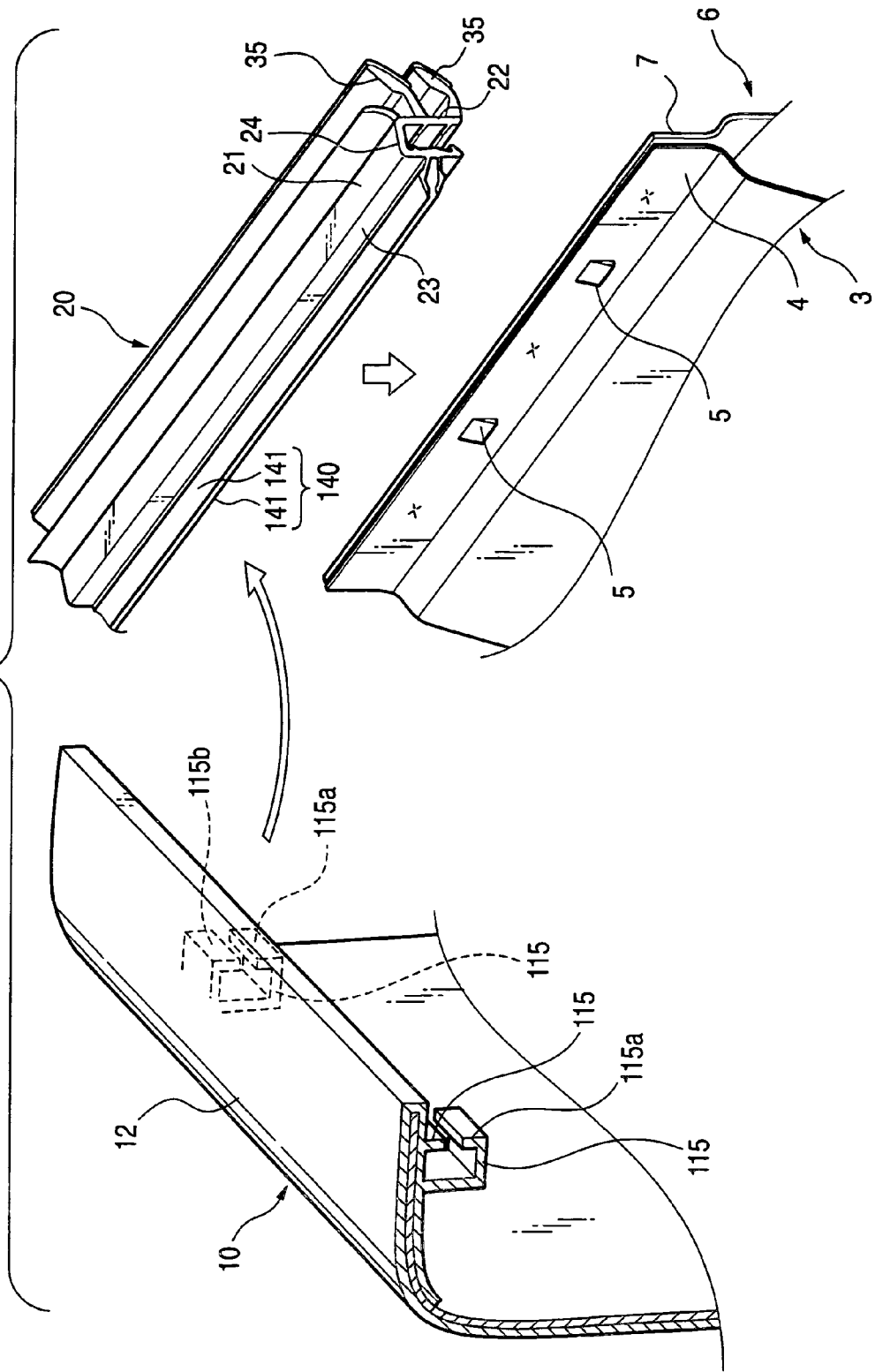
FIG. 7 is a perspective view illustrating a state before the door inner panel, the door trim, and the weather strip in accordance with a second embodiment of the invention are assembled to each other.

FIG. 7 is a perspective view illustrating a state before the door inner panel, the door trim, and the weather strip in accordance with a second embodiment of the invention are assembled to each other. FIG. 8 is a cross-sectional view illustrating a state in which the door inner panel, the door trim, and the weather strip have been assembled to each other.

Figure 8:
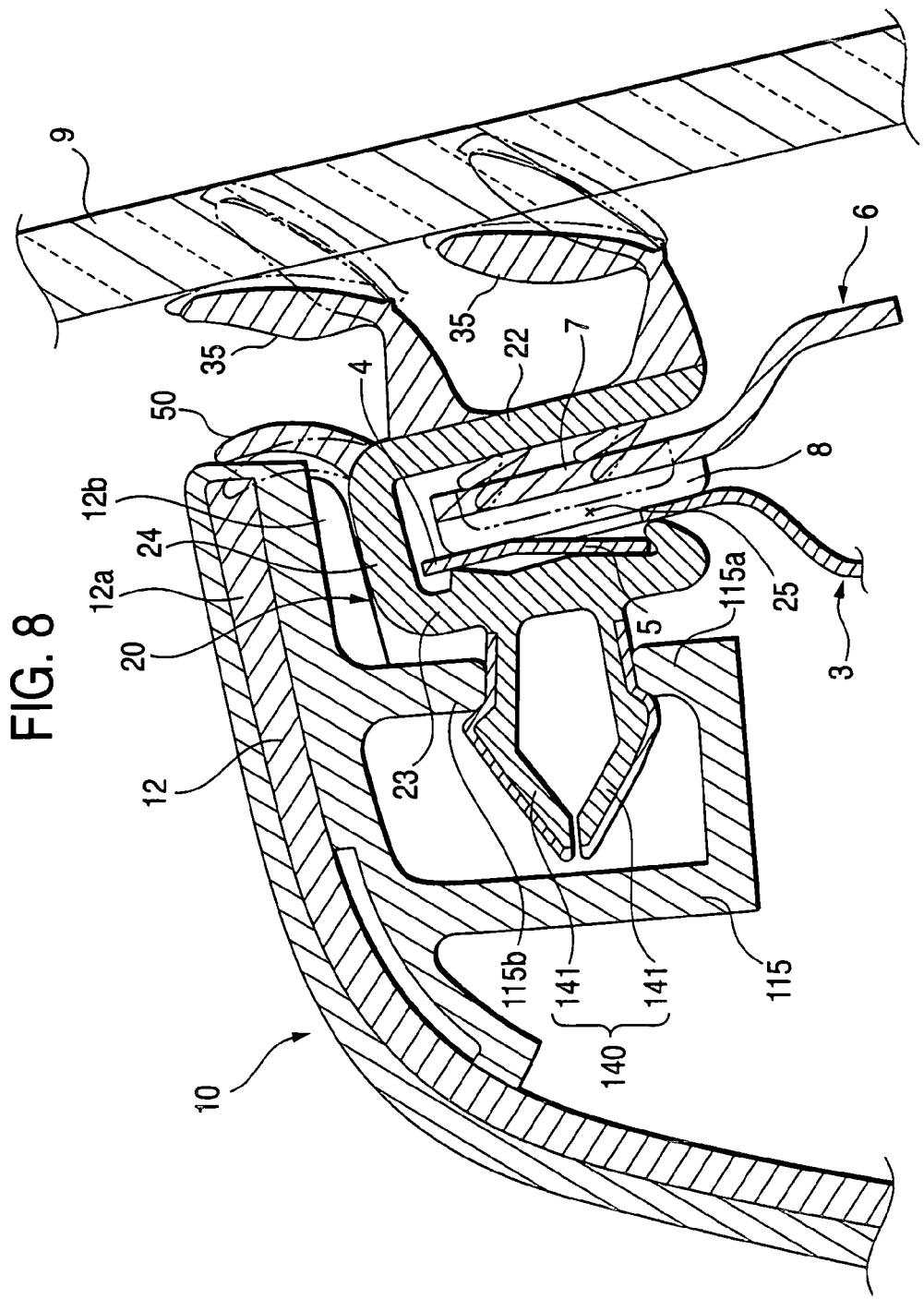
FIG. 8 is a cross-sectional view illustrating a state in which the door inner panel, the door trim, and the weather strip have been assembled to each other in accordance with the second embodiment of the invention.

As shown in FIGS. 7 and 8, in this second embodiment, a plurality of downwardly oriented attaching portions 115 are formed at predetermined intervals on a longitudinal lower surface of the upper portion 12 of the door trim 10. The plurality of downwardly oriented attaching portions 115 are formed by groove portions or recessed portions.

In this second embodiment, the downwardly oriented attaching portion 115 has an upwardly projecting portion 115a and a downwardly projecting portion 115b which are respectively provided at lower and upper portions of a groove-shaped or recessed opening portion, and is formed with a substantially dovetail groove-shaped cross section.

Correspondingly, at a predetermined heightwise position of the interior side wall portion 23 of the main body portion 21 of the weather strip 20, a resilient retainer 140, which is inserted into the groove portions or recessed portions of the plurality of downwardly oriented attaching portions 115 on the lower surface of the upper portion 12 of the door trim 10 and is resiliently engageable therewith, is formed continuously in an elongated shape along the longitudinal direction of the main body portion 21. In addition, the resilient retainer 140 is formed by a pair of retaining pieces 141 which are formed with cross-sectional shapes substantially identical to those of the-plurality of resilient retainers 40.

Since the other arrangements of this second embodiment are substantially similar to those of the first embodiment, identical component parts will be denoted by the same reference numerals, and a description thereof will be omitted.

Accordingly, in this second embodiment as well, the weather strip 20 can be fitted over the upper edge flange 4 of the door inner panel 3 (including the upper edge flange 7 of the reinforcing panel 6) from a diagonally upward direction thereof, and can be easily installed.

In addition, in the state in which the weather strip 20 is fitted over the upper edge flange 4 of the door inner panel 3, the pair of retaining pieces 141 making up the elongated resilient retainer 140 respectively project substantially horizontally from the interior side wall portion 23 of the main body portion 21 toward the interior side, and are substantially perpendicular to the downwardly oriented attaching portions 115 of the door trim 10.

For this reason, while the pair of retaining pieces 141 making up the elongated resilient retainer 140 is being visually observed, the position of the pair of retaining pieces 141 is confirmed, and the door trim 10 is moved substantially horizontally and is pressed in. The pair of retaining pieces 141 are thereby inserted easily into the groove portions or recessed portions of the plurality of downwardly oriented attaching portions 115, and are resiliently engaged therewith. Consequently, the attaching operation (fixing operation) of the door trim 10 can be easily effected.

In addition, the elongated resilient retainer 140 can be easily formed on the main body portion 21 of the weather strip 20 integrally and continuously in the longitudinal direction thereof by co-extrusion. For this reason, the trouble that the resilient retainer 140 is peeled and come off the main body portion 21 does not occur.

Furthermore, in this second embodiment, the resilient retainer 140 having the pair of retaining pieces 141 is formed continuously in an elongated shape along the longitudinal direction of the main body portion 21. For this reason, unlike the first embodiment, it is unnecessary to form the plurality of resilient retainers 40 (pairs of retaining pieces 41) by interruptedly removing the protrusions 40A for resilient retainers in the longitudinal direction thereof.

(Third Embodiment)

Next, a description will be given of a third embodiment of the invention with reference to FIGS. 9 and 10.

Figure 9:
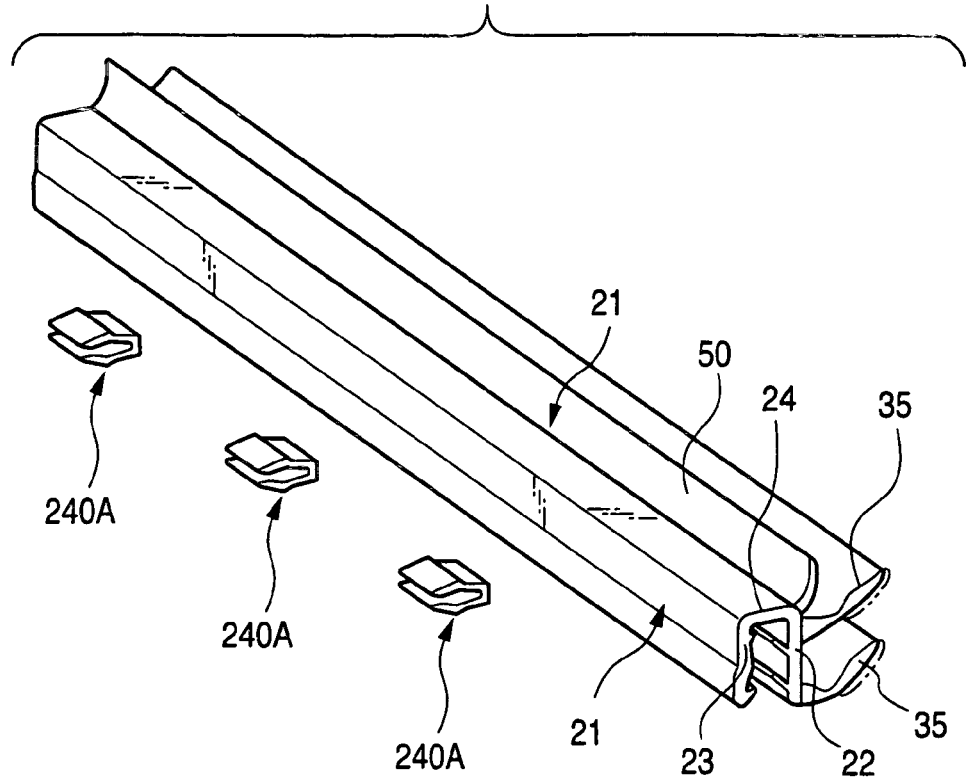
FIG. 9 is a perspective view illustrating a state before component parts for resilient retainers are secured to a main body portion of the weather strip in accordance with a third embodiment of the invention.

FIG. 9 is a perspective view illustrating a state before component parts for resilient retainers are secured to the main body portion of the weather strip. FIG. 10 is a perspective view illustrating a state in which the component parts for resilient retainers are secured to the main body portion of the weather strip to construct the weather strip.

Figure 10:
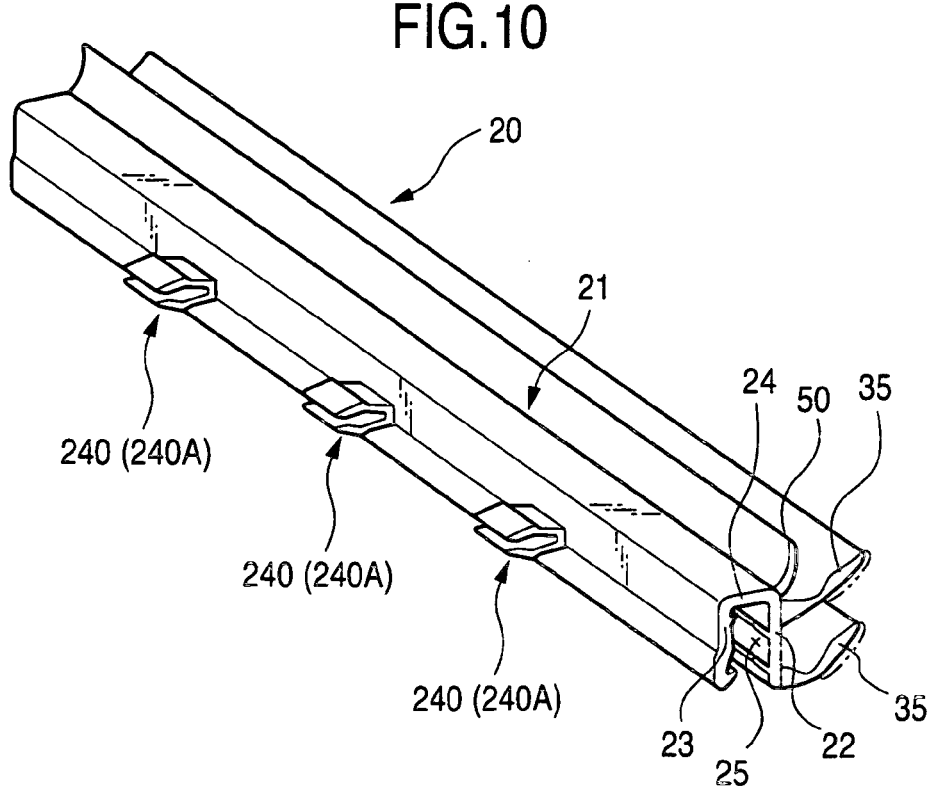
FIG. 10 is a perspective view illustrating a state in which the component parts for resilient retainers are secured to the main body portion of the weather strip to construct the weather strip in, accordance with the third embodiment of the invention.

As shown in FIGS. 9 and 10, in this third embodiment, a plurality of longitudinally short resilient retainer component parts 240A are formed separately from the main body portion 21 of the weather strip 20. As the plurality of resilient retainer component parts 240A are secured at a predetermined heightwise position of the interior side wall portion 23 of the main body portion 21 of the weather strip 20 by an adhesive agent at predetermined intervals in the longitudinal direction thereof, resilient retainers 240 using the plurality of resilient retainer component parts 240A are formed on the interior side wall portion 23 of the main body portion 21.

Since the other arrangements of this third embodiment are substantially similar to those of the first embodiment, identical component parts will be denoted by the same reference numerals, and a description thereof will be omitted.

Accordingly, in this third embodiment, it is unnecessary to form the main body portion 21 and the resilient retainer component parts 240A of the weather strip 20 by respectively appropriately selecting from compatible materials, and the main body portion 21 and the resilient retainer component parts 240A can be formed by respectively using optimal materials. For example, the resilient retainer component parts 240A can be formed of a polyoxymethylene (POM) resin material excelling in elasticity and sliding characteristics by injection molding. Namely, since the POM resin material has a low viscosity when it is molten, it is generally difficult to form the resilient retainers 240 integrally with the main body portion 21 by co-extrusion in extrusion molding by using the POM resin material. However, as described above, after the resilient retainer component parts 240A are formed by injection molding or the like separately from the main body portion 21, the resilient retainer component parts 240A can be secured to the interior side wall portion 23 of the main body portion 21 by an adhesive agent. Hence, it is possible to easily construct the resilient retainers 240 formed of the POM resin material. It should be noted that the resilient retainer component parts 240A may alternatively be secured by another joining method such as spin welding, ultrasonic welding, or the like.

(Fourth Embodiment)

Next, a description will be given of a fourth embodiment of the invention with reference to FIG. 11.

Figure 11:
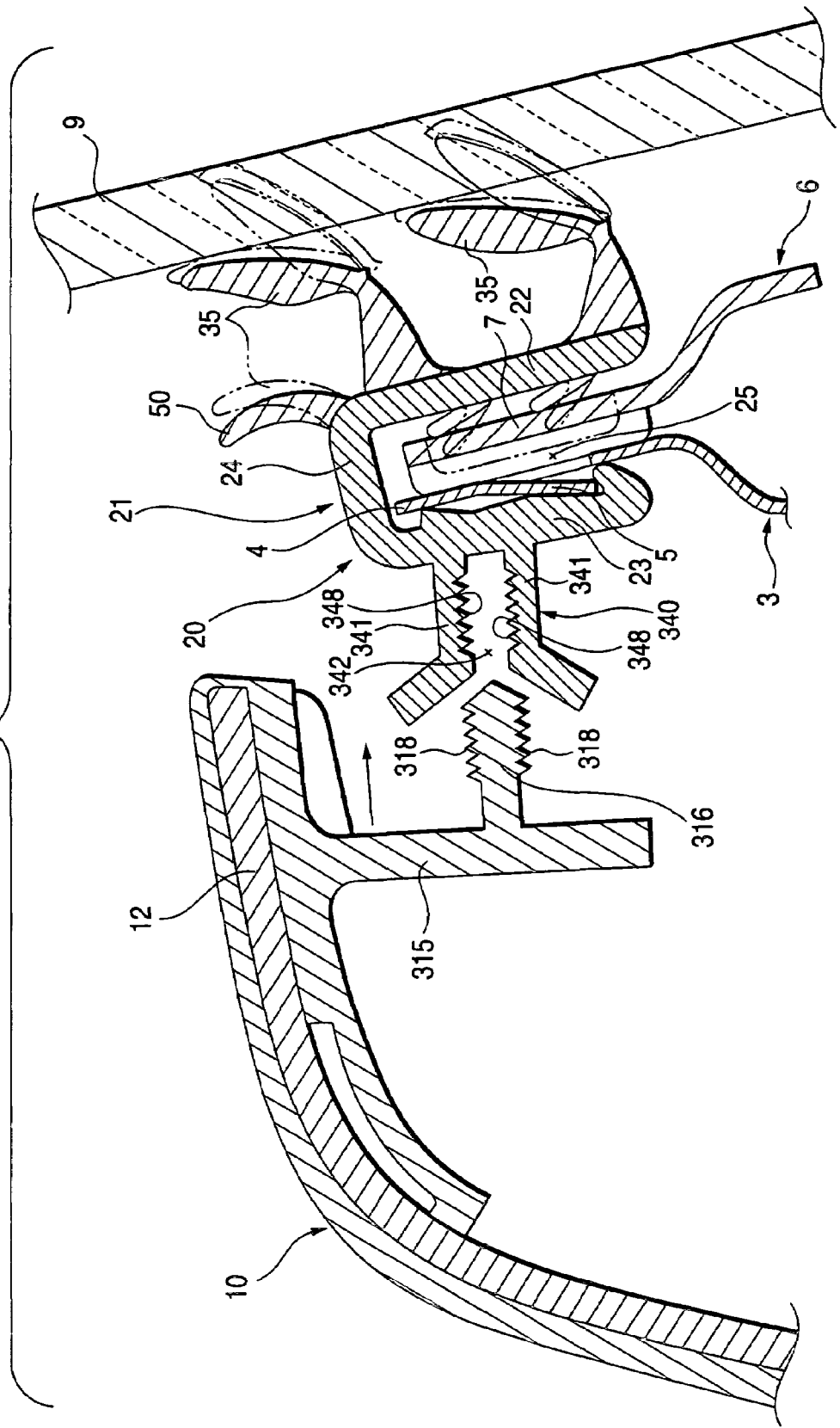
FIG. 11 is a vertical cross-sectional view illustrating a state before the resilient retainer of the weather strip and an attaching portion of the door trim are engaged with each other in accordance with a fourth embodiment of the invention.

FIG. 11 is a cross-sectional view illustrating a state before the resilient retainer of the weather strip and the attaching portion of the door trim are engaged with each other.

As shown in FIG. 11, a retaining projection 316 for attachment is provided in such manner as to project substantially horizontally from an exterior side surface of a downwardly oriented attaching portion 315, which projects in a substantially suspended state from the lower surface of the upper portion 12 of the door trim 10, toward the outer side of the vehicle. Retaining teeth 318 which are serrate in cross section are respectively formed on both upper and lower surfaces of this retaining projection 316 for attachment. It should be noted that, as the retaining projection 316 for attachment, a single elongated retaining projection 316 for attachment may be formed on the downwardly oriented attaching portion 315 continuously in the longitudinal direction thereof, or a plurality of longitudinally short retaining projections 316 for attachment may be formed at predetermined intervals (e.g., pitches of 150 mm to 200 mm).

On the other hand, at a predetermined heightwise position of the interior side wall portion 23 of the main body portion 21 of the weather strip 20, resilient retainers 340 are formed in such a manner as to project substantially horizontally toward the interior side. The resilient retainers 340 are substantially perpendicular to the downwardly oriented attaching portion 315 of the door trim 10, and the retaining projection 316 for attachment of that downwardly oriented attaching portion 315 is inserted into them so as to be resiliently engageable therewith.

In addition, each resilient retainer 340 is formed by a pair of retaining pieces 341 which correspond to upper and lower portions and are spaced apart by an insertion groove 342 for insertion by the retaining projection 316 for attachment so as to be resiliently engageable therewith. Detent teeth 348, which are serrate in cross section and are engageable with the retaining teeth 318 of the retaining projection 316 for attachment, are respectively formed on mutually opposing surfaces of the pair of retaining pieces 341, i.e., on mutually opposing surfaces of the insertion groove 342. It should be noted that, as the pair of retaining pieces 341, a single pair of elongated retaining pieces 341 making up the resilient retainer 340 may be formed on the interior side wall portion 23 of the main body portion 21 continuously in the longitudinal direction thereof, or a plurality of pairs of longitudinally short retaining pieces 341 making up a plurality of resilient retainers 340 may be formed.

Since the other arrangements of this fourth embodiment are substantially similar to those of the first embodiment, identical component parts will be denoted by the same reference numerals, and a description thereof will be omitted.

Accordingly, in this fourth embodiment, in the state in which the weather strip 20 is fixed to the upper edge flange 4 of the door inner panel 3, the resilient retainers 340 each having the pair of retaining pieces 341 respectively project substantially horizontally from the interior side wall portion 23 of the main body portion 21 toward the interior side, and are substantially perpendicular to the downwardly oriented attaching portion 315 of the door trim 10. For this reason, as the retaining projection 316 for attachment of the downwardly oriented attaching portion 315 of the door trim 10 is moved substantially horizontally and inserted into the insertion grooves 342 of the resilient retainers 340 of the main body portion 21, the resilient retainers 340 are resiliently engaged with the retaining projection 316 for attachment. Thus, the door trim 10 is installed stably by the engaging force of the resilient retainers 40 and the retaining projection 316 for attachment.

It should be noted that the invention is not limited to the above-described first to fourth embodiments.

For example, in the above-described first to fourth embodiments, the case has been illustrated in which after the weather strip 20 is fitted to the upper edge flange 4 of the door inner panel 3, the door trim 10 is fitted to the resilient retainers 40 (140, 240, and 340) of the weather strip 20. However, after the door trim 10 is fitted to the resilient retainers 40 (140, 240, and 340) of the weather strip 20, the weather strip 20 may be fitted to the upper edge flange 4 of the door inner panel 3. In addition, as for each resilient retainer 40 (140, 240, and 340), its shape is not limited to the above-described shape insofar as it is capable of resiliently engaging with the attaching hole or the retaining projection 316 for attachment.

As described above, according to the invention, the resilient retainer can be resiliently engaged with the downwardly oriented attaching portion by a simple operation of moving the downwardly oriented attaching portion of the door trim substantially horizontally and push it in. Hence, the door trim can be installed stably.

According to the invention, the exterior side end portion of the upper portion of the door trim can be covered by the shielding lip, so that it is possible to prevent the drawback that a gap is produced between the door trim and the weather strip, thereby aggravating the appearance.

According to the invention, the door trim can be installed by causing the resilient retainers to be respectively engaged in the plurality of attaching holes in the downwardly oriented attaching portion of the door trim by the very simple operation of confirming the positions of the plurality of resilient retainers of the main body portion while visually observing the plurality of resilient retainers and by pushing in the door trim substantially horizontally. Thus, improvement in the operating efficiency in installing the door trim can be attained.

According to the invention, it is unnecessary to form the main body portion and the resilient retainer component parts by respectively appropriately selecting from compatible materials, and the main body portion and the resilient retainer component parts can be formed by respectively using optimal materials.

According to the invention, it is possible to dispense with the time and trouble of fabricating the plurality of resilient retainers separately from the main body portion and securing them by an adhesive agent. Hence, it is possible to reduce the number of components and the number of assembling steps, thereby making it possible to attain a reduction in cost. Moreover it is possible to prevent the trouble that the resilient retainers are peeled and come off the main body portion.

According to the invention, the door trim can be installed by causing the resilient retainer to engage with the downwardly oriented attaching portion of the door trim by the very simple operation of confirming the position of the elongated resilient retainer while visually observing the resilient retainer and by pushing in the door trim substantially horizontally. Thus, improvement in the operating efficiency in installing the door trim can be attained. In addition, as the elongated resilient retainer is integrally formed with the main body portion, the trouble of the resilient retainer becoming peeled and coming off the main body portion does not occur.

According to the invention, the attachment or detachment of the door trim is facilitated. Further, even in cases where the attachment and detachment of the door trim are repeated, the low friction layer makes it possible to alleviate the wear of the resilient retainer and the rattling and the like caused by the wear, and excels in durability.

According to the invention, the main body portion, the resilient retainer, and the seal lip portion can be integrated without using an adhesive agent, a mechanically joining means, or the like, and it is possible to prevent the trouble of the respective members becoming peeled and disengaged from each other.

According to the invention, the main body portion, the resilient retainer, and the seal lip portion can be formed integrally and easily by extrusion molding based on co-extrusion. Moreover, light weight can be attained by forming the main body portion, the resilient retainer, and the seal lip portion by mainly using an olefinic thermoplastic elastomer material which material is easily available.

According to the invention, intentional removal of the door trim with respect to the weather strip is facilitated, and removal is prevented with respect to unintentional removal, thereby making it possible to improve stability in installation.

According to the invention, since the tapered distal end portions of the pair of retaining pieces are opposed to each other in a mutually close or contacting state, the tapered distal end portions of the pair of retaining pieces can be easily inserted in and engaged with the hole or the opening portion of the groove formed in the attaching portion of the door trim. Thus, it is possible to attain improvement of the efficiency in installing the weather strip with respect to the attaching portion of the door trim.

According to the invention, there are advantages in the improvement of the operating efficiency in assembling the weather strip and in the prevention of the rattling of the main body portion during the lifting or lowering operation of the lifting/lowering window pane.

What is claimed is:

1. A weather strip for a vehicle door configured to be fitted to an upper edge flange of a door inner panel forming a window opening edge of the vehicle door having a lifting/lowering window pane, the weather strip comprising:
   a main body portion extending longitudinally and having an insertion groove to be fitted to the upper edge flange from above, the insertion groove configured to allow the upper edge flange to be inserted therein;
   a seal lip portion extending longitudinally along the main body portion and projecting integrally from the main body portion to be in resilient contact with the lifting/lowering window pane along the main body portion;
   a resilient retainer to be resiliently engaged with a door trim, the resilient retainer formed integrally with the main body portion; and
   a shielding lip extending longitudinally along the main body portion and projecting integrally from the main body portion substantially upward to cover an exterior side end portion of the upper portion of the door trim, wherein the shielding lip is made of a material elastically deformable and softer than the main body portion; and the material contains at least one of rubber and a synthetic resin material, the main body portion includes a fixing portion integrally formed therewith and configured to be engaged with the upper edge flange when the insertion groove is fitted to the upper edge flange so that the weather strip is fixed at a predetermined position on the upper edge flange, and the resilient retainer is projected outward from the main body portion substantially in a horizontal direction when the insertion groove is fitted to the upper edge flange so that the resilient retainer is substantially perpendicular to an attaching portion provided at an upper portion of the door trim projecting substantially in a vertical direction.

2. The weather strip for a vehicle door according to claim 1, wherein the resilient retainer includes a plurality of resilient retainers, and the plurality of resilient retainers are provided at predetermined intervals in a longitudinal direction of a vehicle interior side wall of the main body portion in correspondence with a plurality of attaching holes provided in the attaching portion.

3. The weather strip for a vehicle door according to claim 2, wherein the plurality of resilient retainers include a plurality of resilient retainer component parts formed separately from the main body portion; and the plurality of resilient retainers are secured to the vehicle interior side wall at predetermined intervals in the longitudinal direction thereof.

4. The weather strip for a vehicle door according to claim 2, wherein the plurality of resilient retainers are formed as remaining portions of a projecting portion for a resilient retainer, the projecting portion formed continuously along the longitudinal direction of the main body portion, and the projecting portion for a resilient retainer is removed interruptedly in the longitudinal direction so that the remaining portions are remained.

5. The weather strip for a vehicle door according to claim 1, wherein the resilient retainer extends longitudinally and continuously along a vehicle interior side wall of the main body portion such that the resilient retainer is engageable with one of a groove portion and a recessed portion provided in the attaching portion.

6. A weather strip for a vehicle door configured to be fitted to an upper edge flange of a door inner panel forming a window opening edge of the vehicle door having a lifting/lowering window pane, the weather strip comprising:
   a main body portion extending longitudinally and having an insertion groove to be fitted to the upper edge flange from above, the insertion groove configured to allow the upper edge flange to be inserted therein;
   a seal lip portion extending longitudinally along the main body portion and projecting integrally from the main body portion to be in resilient contact with the lifting/lowering window pane along the main body portion; and
   a resilient retainer to be resiliently engaged with a door trim, the resilient retainer formed integrally with the main body portion, wherein the main body portion includes a fixing portion integrally formed therewith and configured to be engaged with the upper edge flange when the insertion groove is fitted to the upper edge flange so that the weather strip is fixed at a predetermined position on the upper edge flange, the resilient retainer is projected outward from the main body portion substantially in a horizontal direction when the insertion groove is fitted to the upper edge flange so that the resilient retainer is substantially perpendicular to an attaching portion provided at an upper portion of the door trim projecting substantially in a vertical direction, and the resilient retainer has a low friction layer on at least a surface thereof to be in contact with the attaching portion.

7. A weather strip for a vehicle door configured to be fitted to an upper edge flange of a door inner panel forming a window opening edge of the vehicle door having a lifting/lowering window pane, the weather strip comprising:
   a main body portion extending longitudinally and having an insertion groove to be fitted to the upper edge flange from above, the insertion groove configured to allow the upper edge flange to be inserted therein;
   a seal lip portion extending longitudinally along the main body portion and projecting integrally from the main body portion to be in resilient contact with the lifting/lowering window pane along the main body portion; and
   a resilient retainer to be resiliently engaged with a door trim, the resilient retainer formed integrally with the main body portion, wherein the main body portion includes a fixing portion integrally formed therewith and configured to be engaged with the upper edge flange when the insertion groove is fitted to the upper edge flange so that the weather strip is fixed at a predetermined position on the upper edge flange, the resilient retainer is projected outward from the main body portion substantially in a horizontal direction when the insertion groove is fitted to the upper edge flange so that the resilient retainer is substantially perpendicular to an attaching portion provided at an upper portion of the door trim projecting substantially in a vertical direction, and the main body portion and the resilient retainer are made of a semi-hard or hard thermoplastic resin material exhibiting a durometer hardness HDA of 85 degrees or more in JIS K 7215, and the seal lip portion is formed of a soft or semi-hard thermoplastic resin material which is compatible with said main body portion and exhibits a durometer hardness HDA of 60 to 80 degrees in JIS K 7215.

8. The weather strip for a vehicle door according to claim 7, wherein the main body portion, the resilient retainer, and the seal lip portion are formed of a thermoplastic resin material mainly based on an olefinic thermoplastic elastomer, and are integrally formed by extrusion molding based on co-extrusion.

9. The weather strip for a vehicle door according to claim 1, wherein the resilient retainer has a pair of upper and lower retaining pieces each having a projecting portion for resiliently retaining the attaching portion, and the upper retaining piece has a projecting dimension greater than a projecting dimension of the lower retaining piece.

10. The weather strip for a vehicle door according to claim 9, wherein the upper and lower retaining pieces have tapered distal end portions respectively, and the tapered distal end portions are opposed to each other in a mutually close or contacting state.

11. A weather strip for a vehicle door configured to be fitted to an upper edge flange of a door inner panel forming a window opening edge of the vehicle door having a lifting/lowering window pane, the weather strip comprising:
   a main body portion extending longitudinally and having an insertion groove to be fitted to the upper edge flange from above, the insertion groove configured to allow the upper edge flange to be inserted therein;
   a seal lip portion extending longitudinally along the main body portion and projecting integrally from the main body portion to be in resilient contact with the lifting/lowering window pane along the main body portion; and a resilient retainer to be resiliently engaged with a door trim, the resilient retainer formed integrally with the main body portion, wherein the main body portion includes a fixing portion integrally formed therewith and configured to be engaged with the upper edge flange when the insertion groove is fitted to the upper edge flange so that the weather strip is fixed at a predetermined position on the upper edge flange, and the resilient retainer is projected outward from the main body portion substantially in a horizontal direction when the insertion groove is fitted to the upper edge flange so that the resilient retainer is substantially perpendicular to an attaching portion provided at an upper portion of the door trim projecting substantially in a vertical direction, wherein further the main body portion includes: a retaining recessed portion allowing a retaining pawl of the upper edge flange of the door panel to be inserted, a retaining projecting portion engageable with the retaining pawl, and an abutment portion to be abutted against the upper edge flange, wherein the retaining recessed portion, the retaining projecting portion, and the abutment portion are respectively formed on a groove wall surface on a vehicle interior side wall of the insertion groove of the main body portion, and lip-shaped upper and lower pressing pieces both projecting toward the upper edge flange are integrally provided on a groove wall surface on an exterior side wall portion side of the insertion groove.

* * * * *